(12) United States Patent
Lee

(10) Patent No.: US 11,307,346 B2
(45) Date of Patent: Apr. 19, 2022

(54) BACKLIGHT UNIT AND DISPLAY APPARATUS COMPRISING SAME

(71) Applicant: SAMSUNG ELECTRONICS CO., LTD., Suwon-si (KR)

(72) Inventor: Kyehoon Lee, Suwon-si (KR)

(73) Assignee: SAMSUNG ELECTRONICS CO.. LTD., Suwon-si (KR)

( * ) Notice: Subject to any disclaimer, the term of this patent is extended or adjusted under 35 U.S.C. 154(b) by 0 days.

(21) Appl. No.: 17/075,318

(22) Filed: Oct. 20, 2020

(65) Prior Publication Data
US 2021/0149100 A1 May 20, 2021

(30) Foreign Application Priority Data

Nov. 20, 2019 (KR) .......................... 10-2019-0149893

(51) Int. Cl.
*G02F 1/137* (2006.01)
*F21V 8/00* (2006.01)

(52) U.S. Cl.
CPC .............. *G02B 6/005* (2013.01); *G02F 1/137* (2013.01)

(58) Field of Classification Search
CPC .... G02B 6/005; G02B 26/005; G02B 6/0051; G02F 1/137; G02F 1/13718; G02F 1/1334; G02F 1/13306; G02F 2203/03; G02F 1/133624; G02F 1/133621; G02F 1/133614; G02F 2203/62; G02F 1/133524
See application file for complete search history.

(56) References Cited

U.S. PATENT DOCUMENTS

| 8,692,969 B2 | 4/2014 | Jang et al. | |
|---|---|---|---|
| 9,977,284 B2 | 5/2018 | Ma | |
| 10,036,915 B2 | 7/2018 | Ma et al. | |
| 2016/0070047 A1* | 3/2016 | Okuyama | G02F 1/133617 349/71 |
| 2016/0177181 A1* | 6/2016 | Liu | C09K 11/883 362/606 |
| 2019/0331955 A1 | 10/2019 | Lee | |
| 2021/0199992 A1* | 7/2021 | Rosen | G02F 1/13718 |

FOREIGN PATENT DOCUMENTS

| CN | 107132693 A | 9/2017 |
|---|---|---|
| KR | 10-1636052 B1 | 7/2016 |

OTHER PUBLICATIONS

Communication dated Apr. 13, 2021 issued by the European Patent Office in European Application No. 20208765.6.

* cited by examiner

*Primary Examiner* — Donald L Raleigh
(74) *Attorney, Agent, or Firm* — Sughrue Mion, PLLC

(57) ABSTRACT

Provided are a backlight unit and a display apparatus including the same. The backlight unit includes: a light guide plate configured to diffuse and transmit light that is incident on the light guide plate; and a white light emitting member configured to convert incident light transmitted by the light guide plate to white light having a color temperature that is adjusted according to a degree of conversion of the incident light into light of a specific color based on application of an electrical signal to the white light emitting member, and to emit the white light.

15 Claims, 15 Drawing Sheets

FIG. 4

| | DYE | QUANTUM DOT |
|---|---|---|
| BLU spectrum | | |
| Relative brightness | 100% | 105% |
| DCI Cover (CIE1976) | 80% | 99% |

# BACKLIGHT UNIT AND DISPLAY APPARATUS COMPRISING SAME

CROSS-REFERENCE TO RELATED APPLICATION

This application is based on and claims priority under 35 U.S.C. § 119 to Korean Patent Application No. 10-2019-0149893, filed on Nov. 20, 2019, in the Korean Intellectual Property Office, the disclosure of which is incorporated by reference herein in its entirety.

BACKGROUND

1. Field

The disclosure relates to a backlight unit and a display apparatus including the same, and more particularly, to a backlight unit capable of adjusting color temperature and a display apparatus including the same.

2. Description of Related Art

A display apparatus for displaying an image may include a display panel, and is used in various apparatuses such as televisions, computer monitors, and smartphones. However, because a general display apparatus does not emit light by itself, a backlight unit having a separate light source is required, and the backlight unit may be arranged behind a liquid crystal display (LCD) in the display panel.

The backlight unit is a dimming device that radiates light evenly over the entire display panel, and a display panel including a general backlight unit uses a specific color LED as a light source.

In order to adjust color temperature, electrical signals corresponding to blue, green, and red, which are the primary colors of an image, are adjusted. This is problematic in that a gray level is lost, brightness is lost, and a contrast ratio is lost.

SUMMARY

Provided is a backlight unit capable of adjusting color temperature in hardware and a display apparatus including the same.

Additional aspects will be set forth in part in the description which follows and, in part, will be apparent from the description, or may be learned by practice of embodiments of the disclosure.

In accordance with an aspect of the disclosure, a backlight unit includes: a light guide plate configured to diffuse and transmit light that is incident on the light guide plate; and a white light emitting member configured to convert incident light transmitted by the light guide plate to white light having a color temperature that is adjusted according to a degree of conversion of the incident light into light of a specific color based on application of an electrical signal to the white light emitting member, and to emit the white light.

The white light outputting member may be configured to convert the incident light to white light having a first color temperature when the electrical signal is applied to the white light emitting member, and to convert the incident light to white light having a second color temperature that is different from the first color temperature when the electrical signal is not applied to the white light emitting member.

The first color temperature may be higher than the second color temperature.

The white light outputting member may include a plurality of color conversion particles configured to convert the incident light into the light of the specific color; and a plurality of electro-optical particles configured to adjust the degree of conversion by changing optical properties of the plurality of electro-optical particles based on the electrical signal.

At least one of the plurality of electro-optical particles may include at least one of liquid crystal or an electrowetting material.

The liquid crystal may include at least one of polymer dispersed liquid crystal (PDLC), polymer network liquid crystal (PNLC), cholesteric liquid crystal, or smectic liquid crystal.

At least one of the plurality of color conversion particles may include quantum dots.

The plurality of color conversion particles may include a plurality of first color conversion particles configured to convert blue light into red light; and a plurality of second color conversion particles configured to convert the blue light into green light.

At least one of the plurality of color conversion particles may convert at least one of blue light or green light into red light.

The white light outputting member may further include a base layer in which the plurality of color conversion particles and the plurality of electro-optical particles are dispersed.

The base layer may be a single layer.

The base layer may include a first base layer in which the plurality of electro-optical particles is dispersed; and a second base layer in which the plurality of color conversion particles is dispersed.

The first base layer and the second base layer may be sequentially arranged such that the first base layer is positioned between the light guide plate and the second base layer.

The backlight unit may further include a first electrode and a second electrode that are positioned apart from each other with the white light outputting member positioned therebetween, and the first electrode and the second electrode are configured to apply the electrical signal to the white light outputting member.

The white light outputting member may include a plurality of color conversion particles configured to convert the incident light into the light of the specific color, and wherein the color temperature of the white light is adjusted by adjusting the density of the plurality of color conversion particles based on the application of the electrical signal.

The backlight unit may further include a light source configured to emit the light that is incident on the light guide plate; and a display panel configured to generate an image using the white light output by the white light outputting member.

The white light outputting member may include a plurality of color conversion particles configured to convert the incident light into the light of the specific color; and a plurality of electro-optical particles configured to adjust the degree of conversion by changing optical properties of the plurality of electro-optical particles based on the electrical signal.

At least one of the plurality of color conversion particles may include quantum dots.

At least one of the plurality of electro-optical particles may include at least one of polymer dispersed liquid crystal (PDLC), polymer network liquid crystal (PNLC), cholesteric liquid crystal, and smectic liquid crystal.

The display panel may include a liquid crystal display panel.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a view illustrating spectral results emitted from a white light emitting member in a case of using a general dye and in a case of using quantum dots as color conversion particles;

DETAILED DESCRIPTION

In order to fully understand the configuration and effects of the disclosure, embodiments will be described with reference to the accompanying drawings. The disclosure may, however, be embodied in many different forms and should not be construed as limited to the embodiments set forth herein. However, the description of the embodiments is provided to complete the disclosure, and to fully inform one of ordinary skill in the art of the scope of the disclosure. In the accompanying drawings, the elements are enlarged in size than actual ones for convenience of description, and the ratio of each element may be exaggerated or reduced.

It should be understood that when one element is described as being "on" or "in contact with" the other element, the element may be directly in contact with or connected to the other element, but another component may exist between them. On the other hand, it should be understood that when one element is described as being "directly on" or "directly in contact with" the other element, no other element exists between the elements. Other expressions describing the relationship between elements, for example, "between" and "directly between" may be interpreted as above.

It will be understood that, although the terms first, second, etc. may be used herein to describe various elements, these elements should not be limited by these terms. These terms are only used to distinguish one element from another. For example, a first element could be termed a second element without departing from the teachings of the disclosure, and similarly, the second element could also be termed the first element.

An expression used in the singular encompasses the expression of the plural, unless it has a clearly different meaning in the context. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Throughout the disclosure, the expression "at least one of a, b or c" indicates only a, only b, only c, both a and b, both a and c, both b and c, all of a, b, and c, or variations thereof.

Unless otherwise defined, all terms used herein have the same meaning as commonly understood by one of ordinary skill in the art to which embodiments belong.

Figure 1:
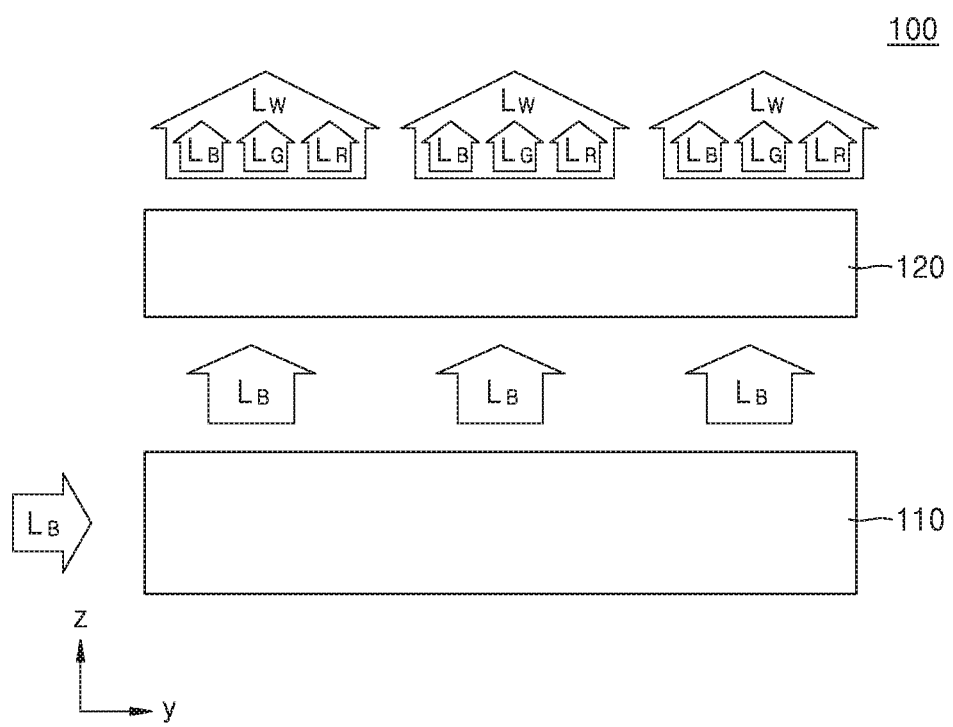
FIG. 1 is a view of a backlight unit according to an embodiment.

FIG. 1 is a view of a backlight unit 100 according to an embodiment. Referring to FIG. 1, the backlight unit 100 may include a light guide plate 110 for transmitting light by increasing the cross-sectional area while guiding incident light and a white light emitting member 120 emitting white light $L_W$ whose color temperature is adjustable by adjusting a degree of conversion of light incident from the light guide plate 110 into light of a specific color according to an applied signal.

The light guide plate 110 may output the incident light by changing the cross-sectional area, that is, the dimension of the output light. When the incident light is spot light, the light guide plate 110 may change the spot light to line light or surface light and output the light. Alternatively, when the incident light is linear light, the light guide plate 110 may change the linear light to surface light and output the light.

The light guide plate 110 includes a material having high light transmittance in a visible light area. For example, the light guide plate 110 may include a glass material. Alternatively, the light guide plate 110 may include a transparent polymer resin such as polymethyl methacrylate (PMMA).

Light input to the light guide plate 110 may have a wavelength of a specific color. For example, the input light may be blue light $L_B$. On the other hand, light of different colors for generating an image, for example, green light $L_G$ and red light $L_R$ are required. The backlight unit 100 according to an embodiment may further include the white light emitting member 120 that generates light of a specific color, for example, the green light $L_G$ and the red light $L_R$ using light emitted from the light guide plate 110. In the following description, the white light emitting member 120 will be described as emitting the white light $L_W$ using the blue light $L_B$. However, the disclosure is not limited thereto.

Figure 2:
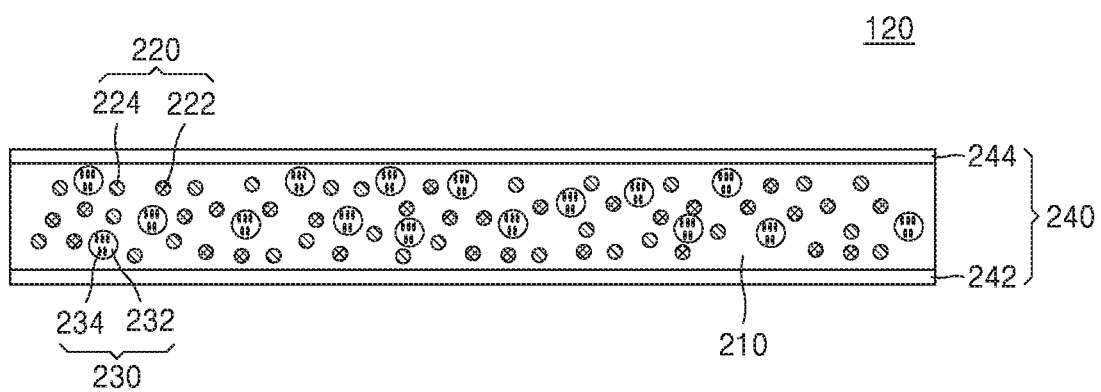
FIG. 2 is a view illustrating a specific example of a white light emitting member of FIG. 1.

FIG. 2 is a view illustrating a specific example of the white light emitting member 120 of FIG. 1. As shown in FIG. 2, the white light emitting member 120 may include a base layer 210, a plurality of color conversion particles 220 dispersed in the base layer 210 and converting the light into light of a specific color, and a plurality of electro-optical particles 230 that are dispersed in the base layer 210 and that adjust a degree of conversion of the color of light by changing optical properties according to an applied electrical signal. The white light emitting member 120 may further include an electrode unit 240 that applies an electrical signal to the electro-optical particles 230.

The base layer 210 may include a transparent polymer material. For example, the base layer 210 may be a transparent cured resin.

Each of the plurality of color conversion particles 220 may absorb at least a portion of incident light, thereby emitting light having a specific color or transmitting it as it is.

When the light incident on the white light emitting member 120 has sufficient energy to excite the color conversion particle 220, the color conversion particle 220 may emit light of a specific color while being stabilized after absorbing at least a portion of the incident light and reaching an excited state. In contrast, when the incident light has energy that is insufficient to excite the color conversion particle 220, the incident light may be emitted through the white light emitting member 120 as it is.

For example, the color of light emitted by the color conversion particle 220 may be determined according to the size of the color conversion particle 220. In general, the larger the size, the longer the wavelength of light may be generated, and the smaller the size, the shorter the wavelength of light may be generated.

According to this embodiment, each of the color conversion particles 220 may include a quantum dot QD. Light emitted from the color conversion particles 220 of the white light emitting member 120 may be emitted in various directions.

For example, the color conversion particles 220 may include first color conversion particles 222 and second color conversion particles 224. Each of the first color conversion particles 222 may absorb light in a first wavelength band and convert the light into light in a second wavelength band. A center wavelength of the second wavelength band is greater than a center wavelength of the first wavelength band. For example, the first wavelength band may be about 400 nm to about 500 nm, and the second wavelength band may be about 480 nm or more to about 560 nm or less. That is, each of the first color conversion particles 222 may substantially convert the blue light $L_B$ to the green light $L_G$.

Each of the second color conversion particles 224 may absorb the light in the first wavelength band and convert the light into light having a third wavelength band. A center wavelength of the third wavelength band may be greater than the center wavelength of the first wavelength band, and may be greater than the center wavelength of the second wavelength band. For example, the third wavelength band may be about 640 nm to about 780 nm. That is, each of the second color conversion particles 224 may substantially convert the blue light $L_B$ into the red light $L_R$.

As described above, according to the size of the color conversion particles 220, the wavelength of light generated by the color conversion particles 220 may be determined. According to this embodiment, the size of each of the first color conversion particles 222 may be less than the size of each of the second color conversion particles 224.

The white light emitting member 120 may further include scatterers. The scatterers may be in a form mixed with the first color conversion particles 222 and the second color conversion particles 224.

The white light emitting member 120 may further include the plurality of electro-optical particles 230 that control a degree of conversion of light of a specific color by changing optical properties of the electro-optical particles 230 according to an applied electrical signal. The electro-optical particles 230 are materials having an electro-optic effect. The electro-optical effect is a phenomenon in which the optical properties change according to an applied electric field, and the electro-optical particles 230 may change a refractive index, a phase delay, polarization properties, etc. of the materials according to the presence and/or strength of the electric field.

An electro-optical particle 230 may include liquid crystal. In the liquid crystal, at least one of the refractive index and the polarization properties may be changed according to the presence and/or strength of the electric field. For example, PDLC, PNLC, cholesteric liquid crystal, smectic liquid crystal, and the like may be used as the electro-optical particle 230.

When an electric field is applied to the base layer 210, the electro-optical particle 230 may refract incident light equally. In other words, light incident on the electro-optical particle 230 may be refracted at the same refractive index regardless of a location where light is incident, and the light may be refracted in the same direction regardless of the location where light is incident. Therefore, when an electric field is applied to the base layer 210, the electro-optical particle 230 may be transparent. In other words, the electro-optical particles 230 may transmit incident light without acting upon it.

When an electric field is not applied to the base layer 210, the electro-optical particles 230 may refract the incident light in different directions with different refractive indices according to the location of incidence of the light upon the electro-optical particles 230. In other words, light incident on the electro-optical particle 230 may be refracted by different refractive indices according to a location where light is incident. Therefore, when an electric field is not applied to the electro-optical particles 230, the electro-optical particle 230 may be opaque. In other words, the electro-optical particles 230 may scatter incident light.

As shown in FIG. 2, the electro-optical particle 230 may be a liquid crystal capsule of polymer material 232 and liquid crystal molecules 234. The liquid crystal capsule encapsulates the liquid crystal molecules 234, and may include a polymer shell and the plurality of liquid crystal molecules 234 arranged inside the polymer shell. The inside of the liquid crystal capsule may be filled with polymer material 232. A diameter of the liquid crystal capsule may be formed to be longer than a length of a long axis of the liquid crystal molecules 234, and may have a size such that the liquid crystal molecules 234 are capable of freely changing an arrangement direction according to an electric field applied to the liquid crystal molecules 234 in the liquid crystal capsule. A difference in refractive index between the polymer material 232 and the liquid crystal molecules 234 may be adjusted according to an alignment direction of the liquid crystal molecules 234.

For example, a liquid crystal molecule 234 may have dielectric anisotropy. That is, refractive indices of a long axis direction and a short axis direction of the liquid crystal molecules 234 may be different from each other. Accordingly, the difference in refractive index between the polymer material 232 and the liquid crystal molecules 234 may be adjusted according to the alignment direction of the liquid crystal molecules 234.

As another example, when an electric field is applied to the electro-optical particles 230, the electro-optical particles 230 refract incident light in different directions with different refractive indices according to a location of incidence of the light, and when an electric field is not applied to the electro-optical particles 230, the electro-optical particle 230 may refract incident light equally.

As such, a refractive index or a refraction direction of the electro-optical particle 230 may be changed according to presence and/or strength of the applied electric field.

However, the disclosure is not limited thereto, and the electro-optical particles 230 only need to change optical properties according to the presence and/or strength of the electric field. For example, a phase delay or a polarization direction of the electro-optical particles 230 may be changed according to the presence and/or strength of the electric field.

The white light emitting member 120 may further include the electrode unit 240 that applies an electrical signal to the base layer 210. The electrode unit 240 may include first and second electrodes 242 and 244 apart from each other with the base layer 210 therebetween. The first and second electrodes 242 and 244 may be transparent conductive materials. When a voltage is applied to the electrode unit 240, an electric field may be formed in the base layer 210.

Figure 3A:
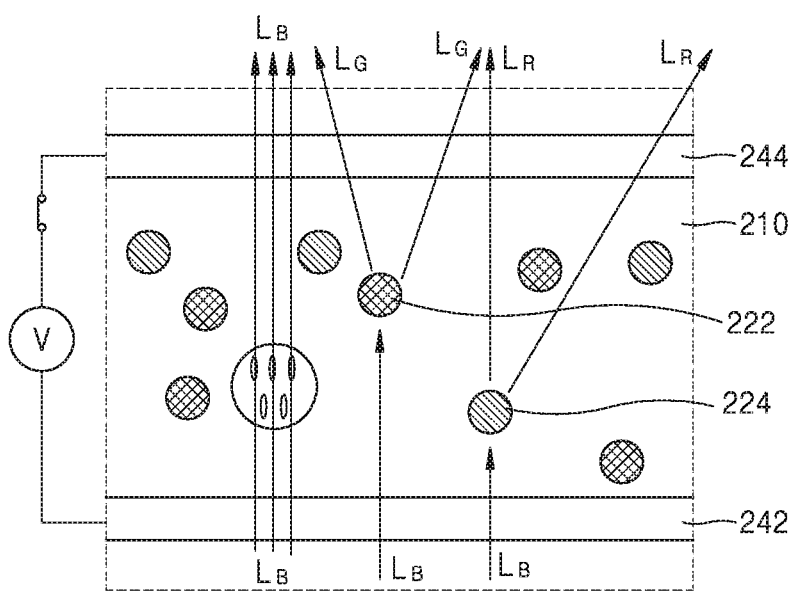
FIG. 3A is a view illustrating a state in which an electric field is applied to a white light emitting member according to an embodiment.

FIG. 3A is a view illustrating a state in which an electric field is applied to a white light emitting member according to an embodiment. As illustrated in FIG. 3A, an electric field may be formed in the base layer 210 by applying a voltage between the first and second electrodes 242 and 244. At this time, the liquid crystal molecules 234 are arranged in a direction of the electric field or in a direction perpendicular to the electric field. When the liquid crystal molecules 234 have positive anisotropy, the liquid crystal molecules 234 may be aligned in a direction parallel to the electric field. Alternatively, when the liquid crystal molecules 234 have negative anisotropy, the liquid crystal molecules 234 may be aligned in a direction perpendicular to the electric field.

A refractive index of the liquid crystal molecules 234 aligned in one direction by an applied electric field may have the same refractive index as that of the polymer material 232, which is a surrounding material, and in this case, a refractive index interface is not formed. Accordingly, light incident on the electro-optical particles 230 proceeds as it is without being refracted by the liquid crystal molecules 234, and may be incident on the color conversion particles 220 or output as it is.

At least a portion of the blue light $L_B$ incident on a first color conversion particle 222 may be converted into the green light $L_G$, and at least a portion of the blue light $L_B$ incident on a second color conversion particle 224 may be converted into the red light $L_R$. Thus, white light $L_W$ formed by mixing the unconverted blue light $L_B$ with the green light $L_G$ and the red light $L_R$ converted by the color conversion particles 220 is output from the white light emitting member 120.

Figure 3B:
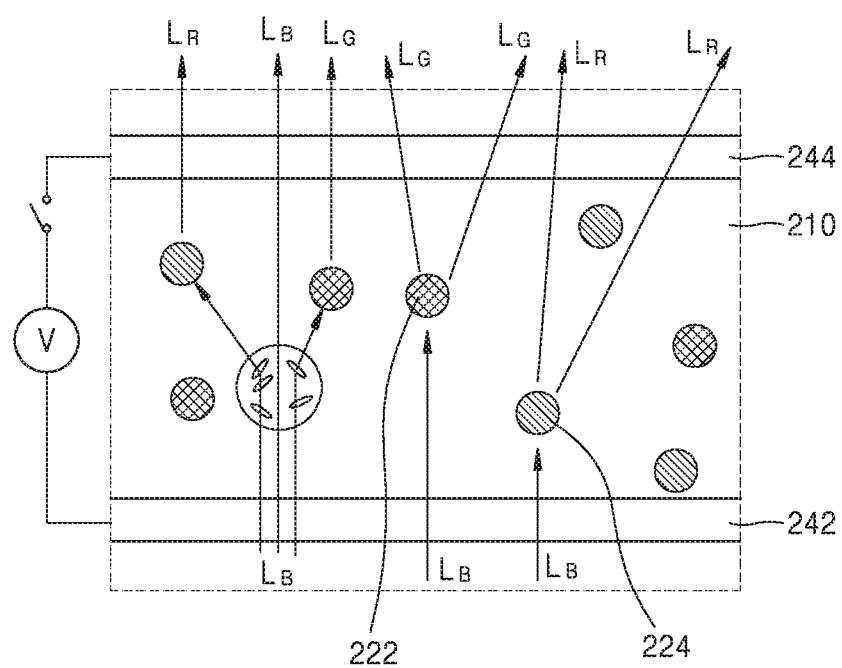
FIG. 3B is a view showing an optical path in the white light emitting member of FIG. 1.

FIG. 3B is a view showing an optical path in the white light emitting member 120 of FIG. 1. As shown in FIG. 3B, when a voltage is not applied between the first and second electrodes 242 and 244 and an electric field is not formed in the base layer 210, the liquid crystal molecules 234 may be arranged in a random direction. In this case, because a refractive index difference between the liquid crystal molecule 234 and a material around the liquid crystal molecule 234, for example, the polymer material 232 is formed, and a refractive index interface is formed in a random direction, the blue light $L_B$ incident on the liquid crystal molecule 234 may be refracted in a random direction to increase the number of times the input light is incident upon the color conversion particle 220 in the base layer 210.

A larger amount of blue light $L_B$ may be incident on the color conversion particles 220. Thus, the blue light $L_B$ may be more converted into the green light $L_G$ and the red light $L_R$. That is, when an electric field is not applied to the base layer 210, the ratio of the blue light $L_B$ is lower than when an electric field is applied, and color temperature of the output white light $L_W$ is lowered.

In particular, when the color conversion particles 220 are formed of quantum dots, the half width of a spectrum of the green light $L_G$ and the red light $L_R$ is narrowed, so that the brightness may increase and color reproduction properties may be improved.

FIG. 4 is a view illustrating spectral results emitted from the white light emitting member 120 in a case of using a general dye and in a case of using quantum dots as the color conversion particles 220. As shown in FIG. 4, when a dye is used, it can be confirmed that red light and green light are emitted, but the half width of a spectrum is wide, while the half width of the red light and green light when quantum dots is used is narrowed. In addition, it can be seen that the brightness of the white light $L_W$ using the quantum dots is higher than that of the white light $L_W$ using the dye, and a DCI cover (i.e., DCI coverage) is also greater.

Figure 5:
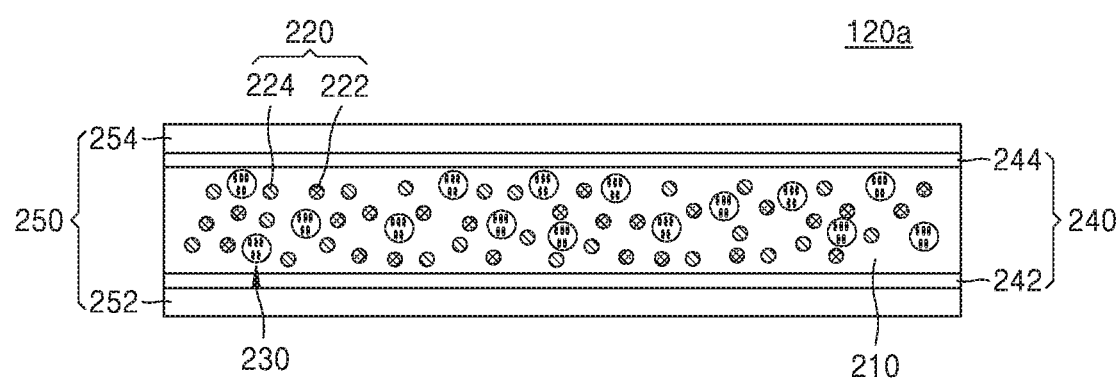
FIG. 5 is a view of a white light emitting member according to an embodiment.

FIG. 5 is a view of a white light emitting member 120a according to an embodiment. Comparing FIGS. 2 and 5, the white light emitting member 120a of FIG. 5 may further include a barrier layer 250. The barrier layer 250 may block supply of moisture and oxygen into the base layer 210. Because the color conversion particles 220 may be susceptible to moisture and oxygen, when moisture and oxygen are supplied from the outside, there may be restrictions on application.

The barrier layer 250 may be arranged on the top and bottom of the base layer 210. For example, the barrier layer 250 may include a first barrier layer 252 arranged on the bottom of the base layer 210 and a second barrier layer 254 arranged on the top of the base layer 210. In FIG. 5, the first barrier layer 252 is arranged in contact with an outer surface of the first electrode 242, and the second barrier layer 254 is arranged in contact with an outer surface of the second electrode 244. However, the disclosure is not limited thereto. The first and second barrier layers 252 and 254 may be respectively arranged between the first electrode 242 and the base layer 210 and between the second electrode 244 and the base layer 210.

In FIG. 2, single first and second electrodes 242 and 244 are at both ends of the base layer 210, but the disclosure is not limited thereto. Various types of electrode structures are also possible.

Figure 6A:
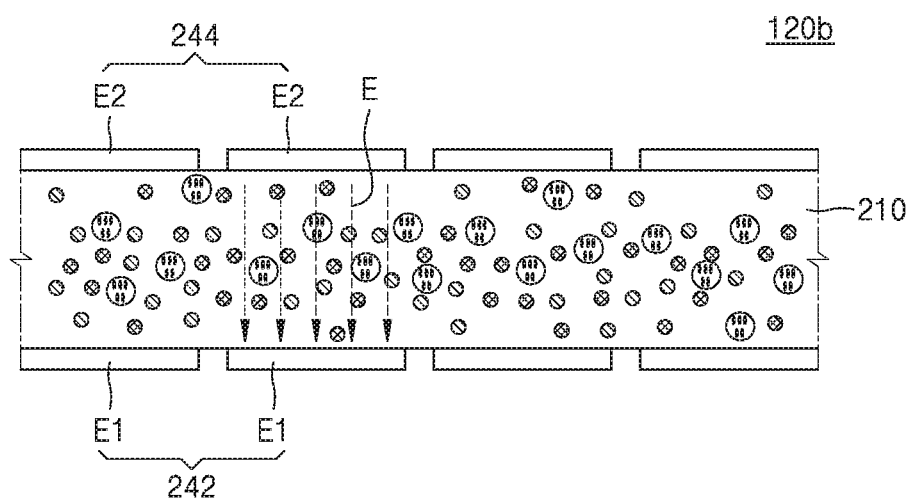
FIGS. 6A and 6B are views of various types of electrode structures.
Figure 6B:
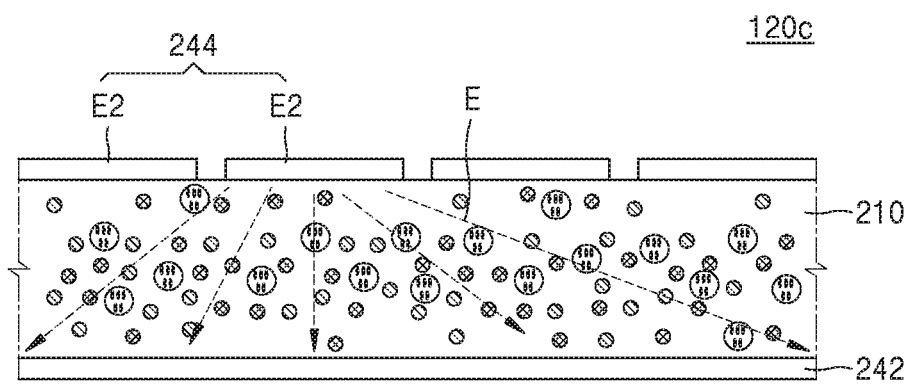

FIGS. 6A and 6B are views of various types of electrode structures. As shown in FIG. 6A, each of the first and second electrodes 242 and 244 may include first and second sub-electrodes E1 and E2 apart from each other. The corresponding first and second sub-electrodes E1 and E2 may independently form an electric field in the base layer 210. Thus, the color temperature of the white light $L_W$ may be adjusted in units of areas overlapping the corresponding first and second sub-electrodes E1 and E2 among the white light emitting members 120.

Alternatively, as shown in FIG. 6B, the first electrode 242 may be formed of a single electrode, while the second electrode 244 may be formed of a plurality of second sub-electrodes E2 apart from each other. While the first electrode 242 is a common electrode, voltages may be applied to the second sub-electrodes E2 independently. For example, when an electrical signal is applied to one of the second sub-electrodes E2 and an electrical signal is not applied to the other second sub-electrodes E2, the width of an area in which an electric field is formed in the base layer 210 may be gradually increased from the second electrode 244 to the first electrode 242. Because the change in color temperature is determined by a ratio of the area in which the electric field is formed, the white light emitting member 120 may emit the white light $L_W$ with a color temperature gradient.

Figure 7:
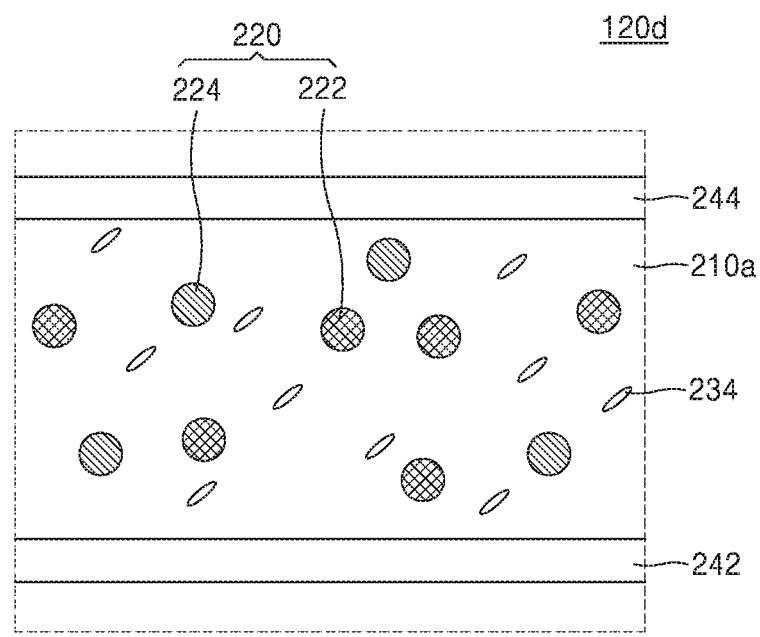
FIG. 7 is a view of a white light emitting member according to an embodiment.

FIG. 7 is a view of a white light emitting member 120d according to an embodiment. A base layer 210a of the white light emitting member 120d illustrated in FIG. 7 may include the polymer material 232 (see FIG. 2) with deformability. In addition, the color conversion particles 220 and the liquid crystal molecules 234 may be dispersed in the base layer 210a. That is, the electro-optical particles 230 may include only the liquid crystal molecules 234. The operation principle of the liquid crystal molecules 234 has been described above, and a detailed description is omitted.

Figure 8:
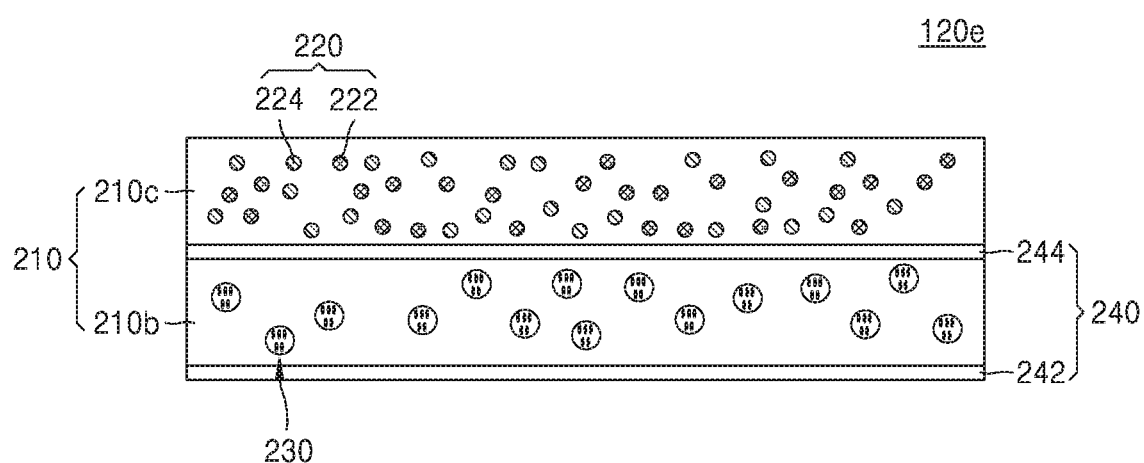
FIG. 8 is a view of a white light emitting member according to an embodiment.

FIG. 8 is a view of a white light emitting member 120e according to an embodiment. The white light emitting member 120e illustrated in FIG. 8 may include first and second base layers 210b and 210c. The first and second base layers 210b and 210c are sequentially arranged such that the first base layer 210b is between the light guide plate 110 and the second base layer 210c, and light may be incident in an order of the first and second base layers 210b and 210c.

In the first base layer 210b, the electro-optical particles 230 having optical properties changed according to an electrical signal may be dispersed, and in the second base layer 210c, the plurality of color conversion particles 220 for converting incident light into light of a specific color may be dispersed. The electrode unit 240 may include first and second electrodes 242 and 244 apart from each other with the first base layer 210b therebetween. Because the color temperature of the white light $L_W$ is adjusted by changing optical properties of the electro-optical particles 230, the first base layer 210b including the electro-optical particles 230 and the electrode unit 240 may be referred to as color temperature adjusting members. Also, because a specific color is generated by the color conversion particles 220, the second base layer 210c including the color conversion particles 220 may be referred to as a color conversion layer.

Although FIG. 8 shows that the liquid crystal molecules 234 are arranged in a liquid crystal capsule, the disclosure is not limited thereto. The first base layer 210b may include a flexible polymer, and the liquid crystal molecules 234 may be dispersed in the first base layer 210b. A white light emitting member 120e of FIG. 8 may have a less color temperature deviation than the white light emitting member 120 of FIG. 2, but may increase a process yield.

Liquid crystal has been described as the electro-optical particle 230 so far, but the disclosure is not limited thereto. The electro-optical particle 230 may include an electrowetting material. Electrowetting may mean changing the surface tension of a liquid using an electrical signal.

For example, wettability of the electrowetting material may increase in a state in which the electrical signal is applied, and thus a surface area of the electrowetting material may increase in an electric field direction. The electrowetting material with a large surface area diffuses incident light. As more light is diffused by the electrowetting material, more light is incident upon the color conversion particles 220. Thus, the ratio of blue light $L_B$ decreases and the ratio of green light $L_G$ and red light $L_R$ increases, so that color temperature decreases.

On the other hand, wettability of the electrowetting material may be lowered in a state in which no electrical signal is applied, and thus a surface area of the electrowetting material may decrease in an electric field direction. The electrowetting material with a small surface area lowers a diffusion rate of incident light. Thus, because the number of incidents to the color conversion particle 220 is also reduced, the ratio of blue light $L_B$ increases and the ratio of green light LG and red light LR decreases, so that color temperature may increase.

It is said that the color temperature is adjusted by adjusting the optical properties by an electrical signal, but the disclosure is not limited thereto. The color temperature may be adjusted by changing the density of the color conversion particles 220.

Figure 9A:
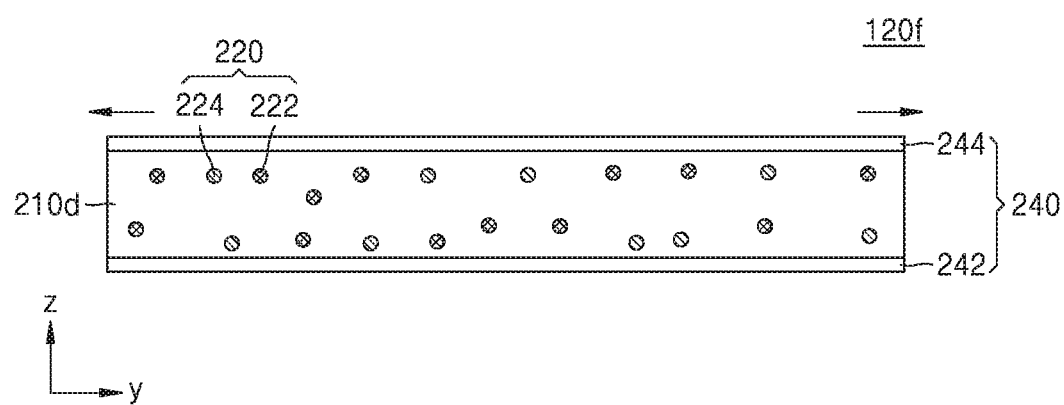
FIG. 9A is a view illustrating an example in which white light having high color temperature is emitted when the density of a white light emitting member according to an embodiment is low.
Figure 9B:
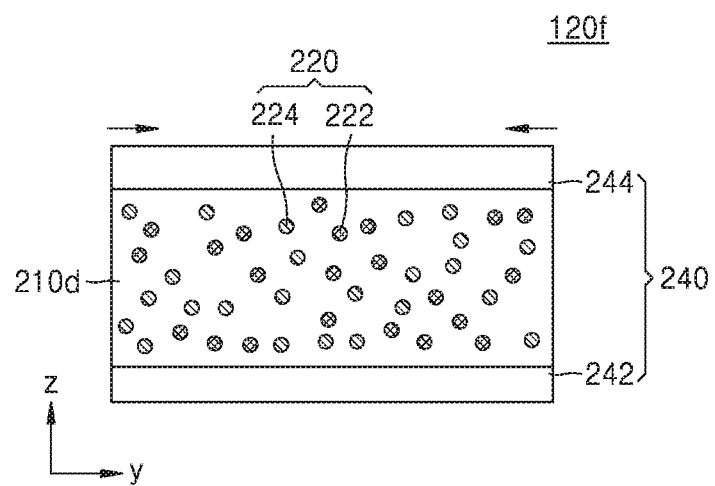
FIG. 9B is a view illustrating an example in which white light having high color temperature is emitted when the density of a white light emitting member according to an embodiment is high.

FIG. 9A is a view illustrating an example in which the white light $L_W$ having high color temperature is emitted when the density of a white light emitting member 120f according to an embodiment is low, and FIG. 9B is a view illustrating an example in which the white light $L_W$ having low color temperature is emitted when the density of the white light emitting member 120f according to an embodiment is high. A base layer 210d of the white light emitting member 120f may include the polymer material 232 (see FIG. 2) with deformability and elastic properties.

When a voltage is applied to the electrode unit 240, as shown in FIG. 9A, the base layer 210d may expand in a longitudinal direction Y of the base layer 210d and contract in a thickness direction. Because the base layer 210d expands in the longitudinal direction and contracts in the thickness direction, the density of the color conversion particles 220 decreases in a light incident direction Z in the base layer 210d. Thus, the number of times incident light enters the color conversion particles 220 is reduced, and thus light having high color temperature may be output from a white light emitting member 120f.

When no voltage is applied to the electrode unit 240, the base layer 210d is restored to its original state. That is, the length of the base layer 210d may be small and the thickness may be large. Thus, the density of the color conversion particles 220 in the base layer 210d increases in the light incident direction Z. Thus, the number of times incident light enters the color conversion particles 220 increases and the number of conversion of green light and red light increases, and thus light having low color temperature may be output from the white light emitting member 120f.

A density change of the color conversion particles 220 may be controlled by a physical force in addition to an electrical signal. For example, when both sides of the base layer 210d are pulled in opposite directions to each other, that is, a tensile force acts, the base layer 210d may be stretched in the longitudinal direction and the density of the color conversion particles 220 may be lowered. Thus, the white light emitting member 120 may output white light having high color temperature.

Alternatively, when a compressive force pushing the base layer 210d in a central axis direction of the base layer 210d acts, the width of the base layer 210d may be reduced to increase the density of the color conversion particles 220. Thus, the white light emitting member 120 may emit white light having low color temperature.

Figure 10:
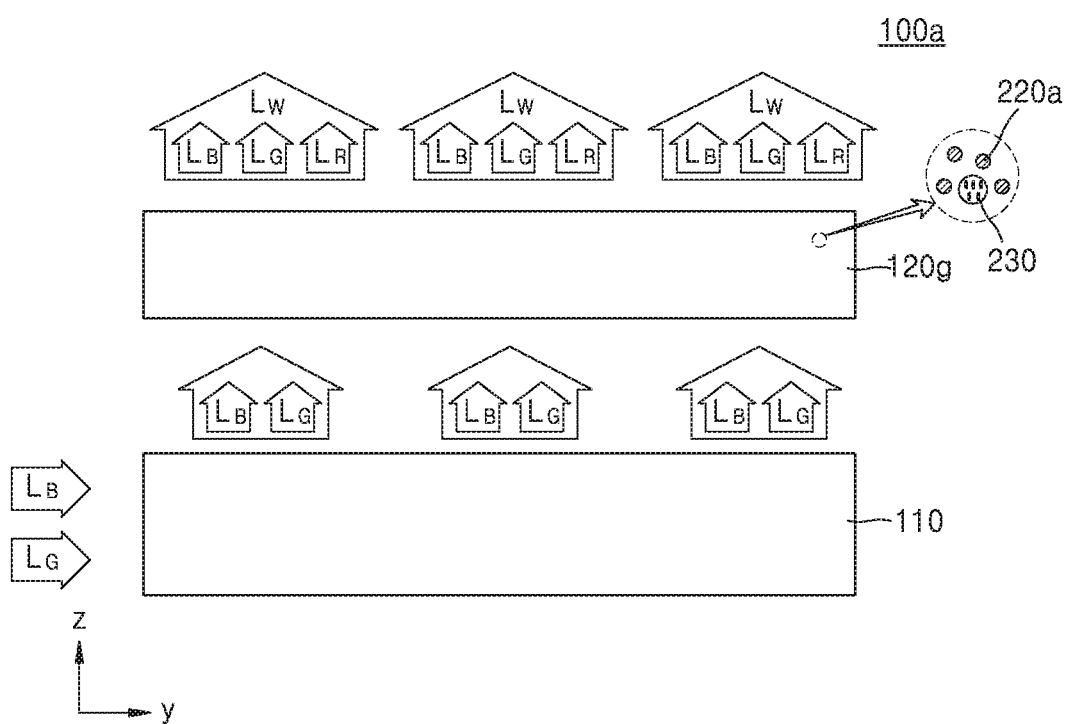
FIG. 10 is a view of a backlight unit according to an embodiment.

FIG. 10 is a view of a backlight unit 100a according to an embodiment. Comparing FIGS. 1 and 10, first light having a first wavelength and second light having a second wavelength may be incident on the light guide plate 110, and the first and second light having a large cross-sectional area may be emitted. For convenience of description of the white light emitting member 120g, the emitted first and second lights may be referred to as the blue light $L_B$ and the green light $L_G$, respectively. The intensity of the first and second light incident on the light guide plate 110 may be adjusted.

A white light emitting member 120g may emit the white light $L_W$ whose color temperature is adjustable by adjusting a degree of converting at least one of the first light and the second light into third light having a third wavelength. The white light emitting member 120g may include color conversion particles 220a converting at least one of the first light and the second light into the third light having a third wavelength and the electro-optical particles 230 adjusting a degree of converting light according to an applied signal.

By adjusting the intensity of the first and second light and an electrical signal of the white light emitting member 120g, the ratio of the first to third lights may be more variously adjusted. Thus, color temperature may be adjusted more precisely.

Figure 11:
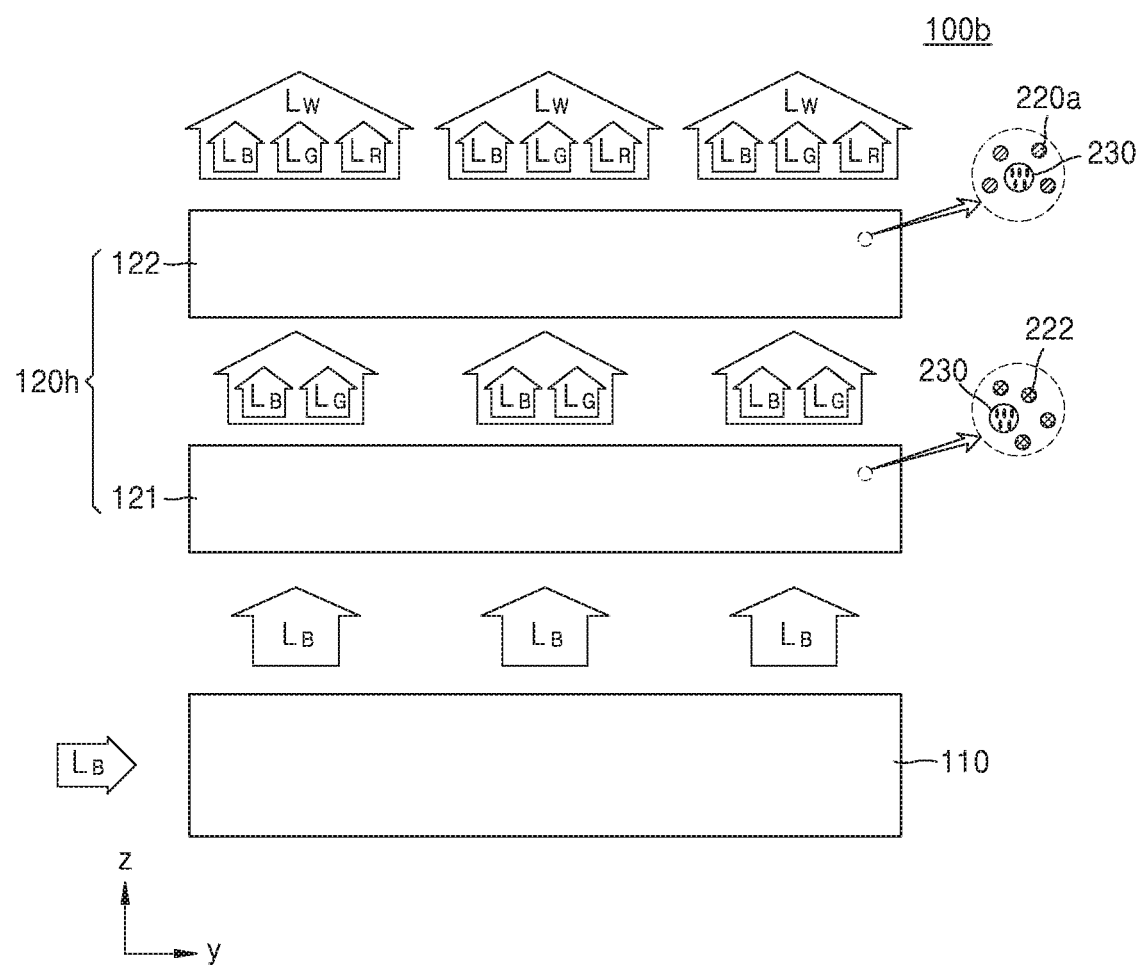
FIG. 11 is a view of a backlight unit according to an embodiment.

FIG. 11 is a view of a backlight unit 100b according to an embodiment. Comparing FIGS. 1 and 11, a white light emitting member 120h may include a first layer 121 that outputs first light and second light by adjusting a degree of conversion of the first light into the second light and a second layer 122 that outputs first to third lights by adjusting a degree of converting at least one of the first and second lights into the third light. Here, the first to third lights may be the blue light $L_B$, green light $L_G$ and red light $L_R$, respectively.

The first layer 121 may include the first color conversion particles 222 that convert the first light into the second light and the electro-optical particles 230 whose optical properties change according to an electrical signal, and the second layer 122 may include the second color conversion particles 220a that convert at least one of the first and second light into the third light and the electro-optical particles 230 whose optical properties change according to an electrical signal. By independently adjusting a degree of conversion of the second light and the third light, color temperature may be more precisely adjusted.

The above-described backlight unit may provide a display apparatus 300 with white light with controlled color temperature.

Figure 12:
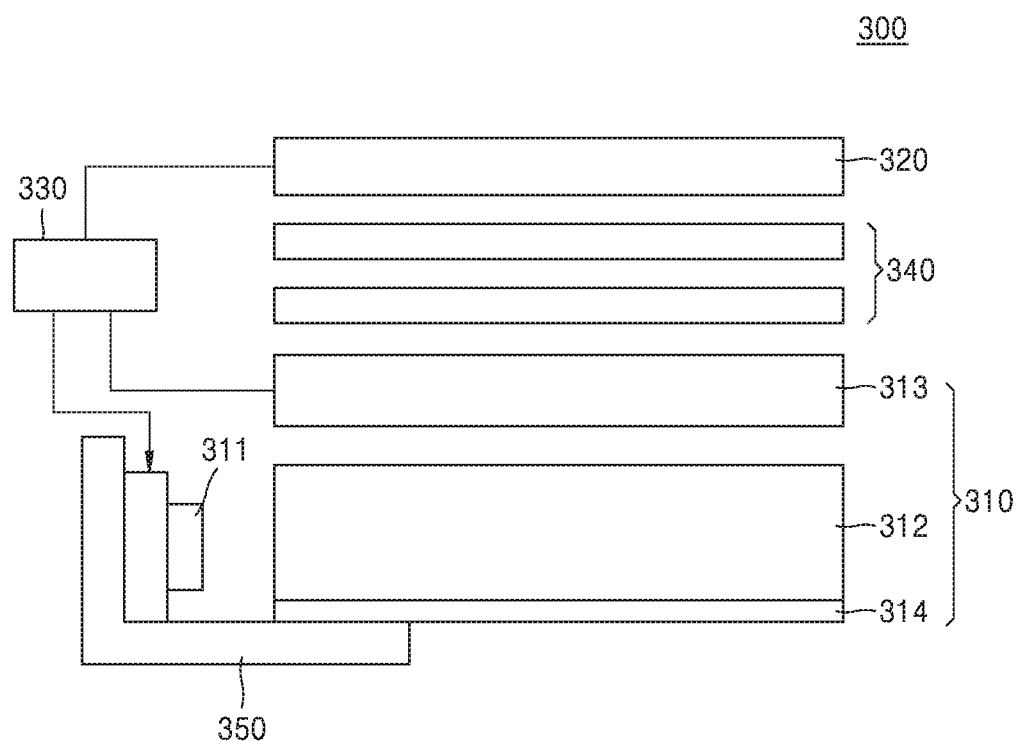
FIG. 12 is a view of a display apparatus including a backlight, according to an embodiment.

FIG. 12 is a view of the display apparatus 300 including a backlight according to an embodiment. As shown in FIG. 12, the display apparatus 300 may include a backlight unit 310 emitting white light, a display panel 320 blocking or passing light emitted from the backlight unit 310, and a control assembly 330 controlling operations of the backlight unit 310 and the display panel 320.

The backlight unit 310 may refract, reflect, and scatter light to increase a cross-sectional area of a light source. For example, the backlight unit 310 may include a light source 311 that emits monochromatic light, a light guide plate 312 that diffuses light incident from the light source 311, and a white light emitting member 313 that converts the monochromatic light into white light whose color temperature is adjustable.

The light source 311 radiates light to implement an image on the display panel 320. In particular, in the case of an edge-lit type display apparatus, the light source 311 is arranged on the side of the light guide plate 312 to indirectly irradiate the display panel 320 with light. Alternatively, in the case of a direct-lit type display apparatus, the light source 311 may directly irradiate the display panel 320 with light.

FIG. 12 shows the edge-lit type display apparatus with the light source 311 arranged on the side of light guide plate 312, but the display apparatus 300 is not limited thereto, and may also be implemented in a direct-lit type with the light source 311 arranged behind the display apparatus 300.

The light guide plate 312 and the white light emitting member 313 may output white light whose color temperature is adjustable. Because the light guide plate 312 and the white light emitting member 313 have been previously described, a detailed description will not be given herein. The backlight unit 310 may further include a reflective sheet 314 that reflects light output from the inside of the light guide plate 312 back toward the bottom of the light guide plate 312 to the inside of the light guide plate 312.

The display panel 320 is provided in front of the backlight unit 310 and may block or pass light emitted from the backlight unit 310 to form an image. The display panel 320 may be a liquid crystal display panel.

The display panel 320 may include a plurality of pixels. The plurality of pixels included in the display panel 320 may block or pass light of the backlight unit 310 independently of each other, and the light passed by the plurality of pixels may form an image. For example, the display panel 320 may include a polarizer film, a transparent substrate, a pixel electrode, a thin film transistor, a liquid crystal layer, a common electrode, a color filter, etc. to implement the plurality of pixels described above.

The control assembly 330 may include a control circuit that controls operations of the backlight unit 310 and the display panel 320. The control circuit may process image data received from an external content source and transmit the image data to the display panel 320. In addition, the control assembly may apply a signal to the white light emitting member 313 to adjust color temperature.

In addition, the display apparatus 300 may include various optical members 340 that control an optical path. For example, the display apparatus 300 may include a diffusion plate that diffuses white light emitted from the backlight unit 310 to make uniform the overall color and brightness of an image displayed through the display panel 320, a prism sheet that increases brightness by refracting or condensing light diffused through the diffusion plate, and a double brightness enhancement film or the like that improves condensing power using polarization properties. In addition, the display apparatus 300 may also include a heat sink 350 to remove heat generated from a light source.

So far, the display apparatus 300 has been described as including the light guide plate 312, but is not limited thereto. The display apparatus 300 may use a diffusion plate (not shown) other than the light guide plate 312 for light diffusion. Alternatively, the display apparatus 300 may include both the light guide plate 312 and the diffusion plate.

According to the disclosure, color temperature may be easily adjusted in the backlight unit 100.

Although embodiments of the disclosure have been described above, the disclosure is not limited to the specific embodiments described above, and various modifications may be implemented by one of ordinary skill in the art without departing from the gist of the disclosure as claimed in the claims. Also, these modifications should not be understood separately from the technical spirit or prospect of the disclosure.

What is claimed is:

1. A backlight unit comprising:
   a light guide plate configured to diffuse and transmit first light that is incident on the light guide plate; and
   a white light emitting member configured to convert incident first light transmitted by the light guide plate to white light based on application of an electrical signal to the white light emitting member, and to output the white light, the white light comprising a part of the first light, second light and third light having different wavelengths from each other, wherein the white light emitting member comprises a single base layer comprising a deformable polymer material in which a plurality of first color conversion particles configured to convert one part of the incident first light into the second light, a plurality of second color conversion particles configured to convert another part of the incident first light into the third light, and a plurality of electro-optical particles are interspersed, and wherein the plurality of electro-optical particles are configured to adjust an amount of the incident first light converted into the second light and the third light by changing optical properties of the plurality of electro-optical particles based on the electrical signal to adjust a color temperature of the white light, and wherein the color temperature of the white light is adjusted by adjusting a density of the plurality of color conversion particles according to the expansion and contraction of the deformable polymer material based on the application of the electrical signal.

2. The backlight unit of claim 1, wherein the white light emitting member is configured to convert the incident first light to white light having a first color temperature when the electrical signal is applied to the white light emitting member, and to convert the incident first light to white light having a second color temperature that is different from the first color temperature when the electrical signal is not applied to the white light emitting member.

3. The backlight unit of claim 2, wherein the first color temperature is higher than the second color temperature.

4. The backlight unit of claim 1, further comprising a first electrode and a second electrode that are positioned apart from each other with the white light emitting member positioned between the first electrode and the second electrode, the first electrode and the second electrode being configured to apply the electrical signal to the white light emitting member.

5. The backlight unit of claim 1, wherein at least one of the plurality of electro-optical particles comprises at least one of liquid crystal and an electrowetting material.

6. The backlight unit of claim 5, wherein the liquid crystal comprises at least one of polymer dispersed liquid crystal (PDLC), polymer network liquid crystal (PNLC), cholesteric liquid crystal, or smectic liquid crystal.

7. The backlight unit of claim 1, wherein at least one color conversion particle of the plurality of first color conversion particles and the plurality of second color conversion particles comprises quantum dots.

8. The backlight unit of claim 1, wherein
the plurality of first color conversion particles are configured to convert blue light into red light; and
the plurality of second color conversion particles are configured to convert the blue light into green light.

9. The backlight unit of claim 1, wherein at least one color conversion particle of the plurality of first color conversion particles and the plurality of second color conversion particles converts at least one of blue light or green light into red light.

10. A backlight unit comprising:
a light guide plate configured to diffuse and transmit light that is incident on the light guide plate; and
a white light emitting member configured to convert incident light transmitted by the light guide plate to white light based on application of an electrical signal to the white light emitting member, and to output the white light, wherein the white light emitting member comprises a base layer in which a plurality of color conversion particles and a plurality of electro-optical particles are interspersed, wherein the plurality of color conversion particles are configured to convert the incident light into light of a specific color, wherein the plurality of electro-optical particles are configured to adjust an amount of the incident light converted into the light of the specific color by changing optical properties of the plurality of electro-optical particles based on the electrical signal to adjust a temperature of the white light, and wherein the base layer comprises:
a first base layer in which the plurality of electro-optical particles are dispersed; and
a second base layer in which the plurality of color conversion particles are dispersed, and wherein the first base layer and the second base layer are sequentially arranged such that the first base layer is positioned between the light guide plate and the second base layer.

11. A backlight unit comprising:
a light guide plate configured to diffuse and transmit light that is incident on the light guide plate; and
a white light emitting member configured to convert incident light transmitted by the light guide plate to white light based on application of an electrical signal to the white light emitting member, and to output the white light, wherein the white light emitting member comprises a plurality of color conversion particles configured to convert the incident light to the white light and a deformable polymer material configured to expand and contract according to the application of the electrical signal, and wherein a color temperature of the white light is adjusted by adjusting a density of the plurality of color conversion particles according to the expansion and contraction of the deformable polymer material based on the application of the electrical signal.

12. A display apparatus comprising:
a light source configured to emit light;
a light guide plate configured to diffuse and transmit first light that is emitted from the light source;
a white light emitting member configured to convert incident first light transmitted by the light guide plate to white light based on application of an electrical signal to the white light emitting member, and to output the white light, the white light comprising a part of the first light, second light, and third light having different wavelengths from each other; and
a display panel configured to generate an image using the white light output by the white light emitting member, wherein the white light emitting member comprises a single base layer comprising a deformable polymer material in which a plurality of first color conversion particles configured to convert one part of the incident first light into the second light, a plurality of second color conversion particles configured to convert another part of the incident first light into the third light, and a plurality of electro-optical particles are interspersed, and wherein the plurality of electro-optical particles are configured to adjust an amount of the incident first light converted into the light of the second light and the third light by changing optical properties of the plurality of electro-optical particles based on the electrical signal, and wherein the color temperature of the white light is adjusted by adjusting a density of the plurality of color conversion particles according to the expansion and contraction of the deformable polymer material based on the application of the electrical signal.

13. The display apparatus of claim 12, wherein at least one color conversion particle of the plurality of first color conversion particles and the plurality of second color conversion particles comprises quantum dots.

14. The display apparatus of claim 12, wherein at least one of the plurality of electro-optical particles comprises at least one of polymer dispersed liquid crystal (PDLC), polymer network liquid crystal (PNLC), cholesteric liquid crystal, or smectic liquid crystal.

15. The display apparatus of claim 12, wherein the display panel comprises a liquid crystal display panel.

* * * * *